United States Patent [19]

Zimmerman et al.

[11] 4,433,170
[45] Feb. 21, 1984

[54] NOVEL BIS(AMINOETHYL)ETHER DERIVATIVES USEFUL AS POLYURETHANE CATALYSTS

[75] Inventors: Robert L. Zimmerman, Austin; Ernest L. Yeakey, Houston, both of Tex.

[73] Assignee: Texaco Inc., White Plains, N.Y.

[21] Appl. No.: 284,427

[22] Filed: Jul. 20, 1981

[51] Int. Cl.³ .................. C07C 93/04; C07C 91/04; C07C 91/12; C07C 91/10
[52] U.S. Cl. .................. 564/508; 521/115; 521/137; 521/167; 528/49; 528/75; 564/471; 564/475; 564/503; 564/506
[58] Field of Search .................. 564/508, 503, 506

[56] References Cited

U.S. PATENT DOCUMENTS

| | | | |
|---|---|---|---|
| 2,716,134 | 8/1955 | Reynolds et al. | 564/508 X |
| 3,415,869 | 12/1968 | Wilkinson et al. | 564/506 X |
| 4,168,242 | 9/1979 | Soula | 564/508 X |

FOREIGN PATENT DOCUMENTS

| | | | |
|---|---|---|---|
| 847900 | 8/1952 | Fed. Rep. of Germany | 564/508 |
| 2525636 | 12/1975 | Fed. Rep. of Germany | 564/508 |

OTHER PUBLICATIONS

Reichhold, "French Patents Abstracts", vol. 7, No. 19, p. 1:6 (May 15, 1967).

*Primary Examiner*—John Doll
*Attorney, Agent, or Firm*—Jack H. Park; Kenneth R. Priem; David L. Mossman

[57] ABSTRACT

The alkylene oxide adduct of bis(aminoethyl)ether may be reacted with formaldehyde in the presence of hydrogen and a hydrogenation-dehydrogenation catalyst to produce new compounds of the formula

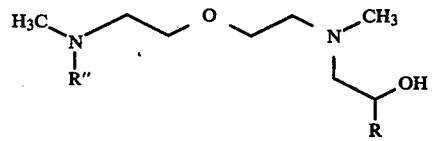

where R is hydrogen or lower alkyl and R" is methyl or

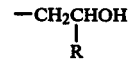

These compounds show unexpectedly high efficiency as polyurethane catalysts. Fewer equivalents of this amine are required to produce foams having the same reaction profile as foams made with piror art amine catalysts.

3 Claims, No Drawings

NOVEL BIS(AMINOETHYL)ETHER DERIVATIVES USEFUL AS POLYURETHANE CATALYSTS

U.S. Pat. No. 4,338,408 directed to polyurethanes made using the bis(aminoethyl)ether derivatives as catalysts issued on July 6, 1982.

BACKGROUND OF THE INVENTION

1. Field of the Invention

The invention relates to novel tertiary amine ethers and more particularly relates to tertiary amine ethers which are useful as catalysts for the reaction of organic isocyanates with active hydrogen-containing compounds to produce urethanes.

2. Description of the Prior Art

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain extending isocyanate-hydroxyl reaction by which a hydroxyl-containing molecule is reacted with an isocyanate-containing molecule to form a urethane. This increases the viscosity of the mixture and provides a polyurethane containing a secondary nitrogen atom in the urethane groups. A second reaction is a crosslinking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of the foam. The third reaction is not essential if an extraneous blowing agent, such as a halogenated, normally liquid hydrocarbon, carbon dioxide, etc. is employed, but is essential if all or even a part of the gas for foam generation is to be generated by this in situ reaction (e.g. in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

It has long been known that tertiary amines, such as trimethylamine, triethylamine, etc., are effective for catalyzing the second crosslinking reaction. Other typical tertiary amines are set forth in U.S. Pat. Nos. 3,925,368; 3,127,436; and 3,243,387 and German OLS Nos. 2,354,952 and 2,259,980. Some of the tertiary amines are effective for catalyzing the third water-isocyanate reaction for carbon dioxide evolution. However, tertiary amines are only partially effective as catalysts for the first chain extension reaction. To overcome this problem, the so-called "prepolymer" technique has been developed wherein a hydroxycontaining polyol component is partially reacted with the isocyanate component in order to obtain a liquid prepolymer containing free isocyanate groups. This prepolymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein a tertiary amine, such as triethylenediamine, is employed in conjunction with an organic tin compound. Triethylenediamine is particularly active for promoting the water-isocyanate reaction and the tin compound is particularly active in synergistic combination with the triethylenediamine for promoting the chain extension reaction. However, even here, the results obtained leave much to be desired. Triethylenediamine is a solid and must be dissolved prior to use to avoid processing difficulties. Also, triethylenediamine and other of the prior art amines can impart a strong amine odor to the polyurethane foam.

In addition to problems of odor and handling due to solid character, other tertiary amines suffer still further deficiencies. For example, in some instances the compounds are relatively high in volatility leading to obvious safety problems. In addition, some catalysts of this type do not provide sufficient delay in foaming, which delay is particularly desirable in molding applications to allow sufficient time to situate the preform mix in the mold. Yet other catalysts, while meeting specifications in this area do not yield foams with a desirable tack-free time.

Lastly, while certain tertiary amines are somewhat suitable in this catalytic area they nevertheless do not have a sufficiently high tertiary amine content in terms of the number of tertiary amines compared to overall molecular weight. It is believed that the higher the tertiary amine content the more rapid the catalytic activity in the polyurethane art.

It would be an advance in the art if a new class of amine catalysts were discovered which would overcome some of the aforementioned disadvantages of the prior art. It would also be advantageous if an unused by-product stream from an existing process could be adapted to provide the new amine catalysts. In the production of morpholine and 2-(2-aminoethoxy)ethanol from ammonia and diethylene glycol, a by-product stream that contains methoxyethylmorpholine and bis-(aminoethyl)ether is produced. This by-product stream may be purified by adding ethylene oxide to react with the bis(aminoethyl)ether and then distilling off the useful methoxyethylmorpholine according to the teaching of U.S. Pat. No. 3,420,828. However, no use has been made of the ethylene oxide adduct of bis(aminoethyl)ether until the invention of the novel tertiary amine ether urethane catalysts herein.

Other tertiary amine ethers useful as catalysts for isocyanate reactions are the beta-(N,N-dimethylamino)alkyl ethers described in U.S. Pat. No. 3,330,782. Other tertiary amines which also have hydroxyl substituents are the hydroxyalkyl tertiary amines of U.S. Pat. No. 4,026,840 and U.S. Pat. No. 4,101,470.

SUMMARY OF THE INVENTION

The invention is a composition of matter having the formula

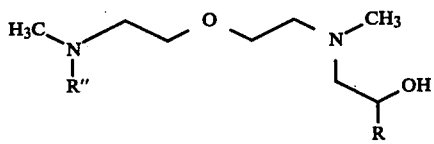

where R is hydrogen or lower alkyl and R" is methyl or

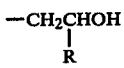

DESCRIPTION OF THE PREFERRED EMBODIMENTS

Generally, the reaction proceeds as follows. Bis-(aminoethyl)ether of the formula $H_2NCH_2CH_2OCH_2CH_2NH_2$ is reacted with an alkylene oxide of the formula

in accordance with the method of U.S. Pat. No. 3,420,828, incorporated by reference herein, wherein R is hydrogen or lower alkyl to produce a compound of the formula

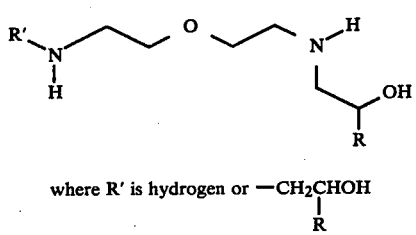

where R' is hydrogen or —CH$_2$CHOH
                              |
                              R By the method of this invention, compound II is reacted with formaldehyde in the presence of hydrogen and a hydrogenation-dehydrogenation catalyst to make compound I.

The reactions of this invention should be conducted at an elevated temperature. The alkoxylation step is preferably conducted in the temperature range from about 50° to 150° C., while the hydrogenation is preferably carried out in the temperature range from about 75° to 250° C. The hydrogen pressure in the second step is preferably from about atmospheric to 3,000 psig and is especially preferred to be on the order of about 1000 psig. The catalyst may be any hydrogenation-dehydrogenation catalyst, though it is preferred that the catalyst contain nickel, copper and chromium oxide or cobalt, copper and chromium oxide, and it is especially preferred that the catalyst be prepared according to the method described in U.S. Pat. No. 3,152,998 assigned to Texaco Chemical Co., incorporated by reference herein.

The starting materials are limited to bis(aminoethyl)ether and alkylene oxides. The alkylene oxides are preferably ethylene oxide, propylene oxide and butylene oxide, although higher oxides may be used. The formaldehyde reactant of the second step may be employed in another form, such as paraformaldehyde. The preparation of the unique compounds of this invention is further illustrated by the following two examples.

EXAMPLE I

PREPARATION OF 2-[N-(DIMETHYLAMINOETHOXYETHYL)-N-METHYLAMINO]ETHANOL

A 1500 ml kettle was charged with 900 grams of a mixture of methoxyethylmorpholine, bis(aminoethyl)ether, aminoethylmorpholine and water in the weight proportions 19:67:5:6. The mixture was heated to 80° C. and 229.7 grams of ethylene oxide was added. The reaction was then digested at 90° C. for 1½ hours. The material was then put through a wiped film evaporator at 90° C. and 0.4mm Hg vacuum. There was obtained 876.7 grams of bottoms material. Five hundred grams of this material was added to a flask which contained 334.5 grams of paraformaldehyde and 1500 ml of isopropanol. This mixture was then transferred to an autoclave and reduced using a nickel, copper, chromium oxide catalyst at 110° C. and 1000 psig of hydrogen. Following the hydrogenation, the reaction mixture was filtered then fractionally distilled. The resulting 2-[N-(dimethylaminoethoxyethyl)-N-methylamino]ethanol had a boiling point of 110°–115° C. at 0.5 mm Hg.

EXAMPLE II

PREPARATION OF 2-[N-DIMETHYLAMINO-ETHOXYETHYL)-N-METHYLAMINO]-1-METHYLETHANOL

A 1500 ml kettle was charged with 900 grams of the mixture of bis(aminoethyl)ether and N-methoxyethylmorpholine in the same proportions as in Example I. The mixture was heated to 80° C. and then 151.4 grams of propylene oxide was added. After digesting at 90° C. for 1½ hours the reaction mixture was discharged into a 2 liter flask. The unreacted portion was then removed under vacuum leaving 386.6 grams of material. Three hundred grams of this material were reductively alkylated using 162.3 grams of paraformaldehyde and a nickel, copper, chromium oxide catalyst at 1000 psig of hydrogen and 110° C. The product was purified using a wiped film evaporator at 120° C. and 0.25 mm Hg vacuum. The overhead fraction contained mainly the 1-propylene oxide adduct with a little 2-propylene oxide adduct also being present.

The suitability of the new bis(aminoethyl)ether derivatives as catalysts for foam formulations is shown in the remaining examples. The quantities listed in all examples are parts by weight. The foams are all prepared by conventional means using conventional polyols, isocyanates and additives. For examples in conventional foam preparation, see the disclosure for U.S. Pat. No. 4,101,470, incorporated by reference herein.

EXAMPLE III

This example illustrates the use of these compounds as catalysts for flexible urethane foams.

|  | A | B | C | D | E |
| --- | --- | --- | --- | --- | --- |
| THANOL ® F-3016[1] | 100 | 100 | 100 | 100 | 100 |
| Silicone L-6202[2] | 1.1 | 1.1 | 1.1 | 1.1 | 1.1 |
| Water | 2.1 | 2.1 | 2.1 | 2.1 | 2.1 |
| 50% Stannous octoate in dioctylphthalate | 0.6 | 0.6 | 0.6 | 0.6 | 0.6 |
| Catalyst Example I | 0.5 | — | — | — | — |
| Catalyst Example II | — | 0.5 | — | — | — |

-continued

| | A | B | C | D | E |
|---|---|---|---|---|---|
| Prior Art Catalyst I[3] | — | — | 0.5 | — | — |
| Prior Art Catalyst II[3] | — | — | — | 0.5 | — |
| Prior Art Catalyst III[3] | — | — | — | — | 0.5 |
| Methylene chloride | 8.0 | 8.0 | 8.0 | 8.0 | 8.0 |
| Toluene diisocyanate | 28.9 | 28.9 | 28.9 | 28.9 | 28.9 |
| Index | 1.05 | 1.05 | 1.05 | 1.05 | 1.05 |
| Cream time (sec) | 6 | 7 | 10 | 11 | 11 |
| Rise time (sec) | 110 | 134 | 145 | 136 | 154 |
| Density, pcf | 2.08 | — | — | 2.04 | 2.06 |

[1] An ethoxylated-propoxylated glycerine of hydroxyl number 56 sold by Texaco Chemical Co.
[2] A silicone surfactant sold by Union Carbide Corp.
[3] Prior art catalyst I is taken from U.S. Pat. No. 4,026,840 and has the following structure

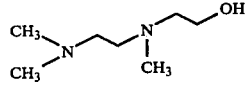

Prior art catalysts II and III are taken from U.S. Pat. No. 4,101,470 and have the following structures, respectively

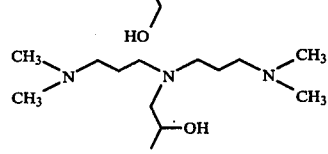

Comparing foams, A, C and D from Example III, one can see that the catalyst of this invention is more efficient than the catalysts in C or D (rise time of 110 seconds vs. 145 and 136). The catalysts in C and D also have a lower amine equivalent weight than the catalyst from Example I (foam C equivalent weight is 73, foam D is 77, while catalyst of Example I has an equivalent weight of 95). Thus the catalysts from Example I give a faster reaction profile with less equivalents of amine being reacted. The same effect can also be observed in the propanol amine compounds (foams B and E).

EXAMPLE IV

This example illustrates the use of these amines as catalysts for rigid urethane foams.

| THANOL ® R-480[1] | 35 | 35 |
|---|---|---|
| Silicone L-5420[2] | 0.5 | 0.5 |
| Water | 0.3 | 0.3 |
| Trichlorofluoromethane | 13 | 13 |
| Catalyst Example I | 0.8 | |
| Catalyst Example II | | 0.8 |
| MONDURA ® MR[3] | 51.2 | 51.2 |
| Index | 1.04 | 1.04 |
| Cream time (seconds) | 10 | 12 |
| Gel time (seconds) | 55 | 76 |
| Tack free time (seconds) | 70 | 104 |
| Rise time (seconds) | 90 | 154 |

[1] An amino-sucrose polyol, hydroxyl number 530, sold by Texaco Chemical Co.
[2] A silicone surfactant sold by Union Carbide Corp.
[3] A polymeric isocyanate sold by Mobay Chemical Co.

EXAMPLE V

This example illustrates the use of these compounds as catalysts for high resilient foams. Again, the unexpected high catalytic activity of these compounds can be observed (for the hydroxyl series foams A, C, and D and for the hydroxypropyl series foams B and E). In each case when used at an equal weight basis the catalysts of this invention gave faster rise times than the other amines. Note also that the same weight of catalyst of this invention contains fewer equivalents of amine than the other catalysts.

| | A | B | C | D | E |
|---|---|---|---|---|---|
| THANOL ® F-6503[1] | 60 | 60 | 60 | 60 | 60 |
| NIAX ® 34-28[2] | 40 | 40 | 40 | 40 | 40 |
| Water | 3.5 | 3.5 | 3.5 | 3.5 | 3.5 |
| Silicone L-5309[3] | 2.0 | 2.0 | 2.0 | 2.0 | 2.0 |
| FOMREZ ® UL-1[4] | 0.01 | 0.01 | 0.01 | 0.01 | 0.01 |
| Catalyst Example I | 0.5 | — | — | — | — |
| Catalyst Example II | — | 0.5 | — | — | — |
| Prior Art Catalyst II | — | — | 0.5 | — | — |
| Prior Art Catalyst I | — | — | — | 0.5 | — |
| Prior Art Catalyst III | — | — | — | — | 0.5 |
| Toluene diisocyanate/PAPI[4] | 42 | 42 | 42 | 42 | 42 |
| Cream time (seconds) | 7 | 8 | 8 | 8 | 8 |
| Rise time (seconds) | 125 | 120 | 140 | 140 | 145 |

[1] A propoxylated-ethoxylated glycerine, hydroxyl number 27, sold by Texaco Chemical Co.
[2] A polymer-polyol, hydroxyl number 28, sold by Union Carbide Corp.
[3] A silicone surfactant sold by Union Carbide Corp.
[4] Toluene diisocyanate 80% by weight, PAPI 20% by weight. PAPI is a polymeric isocyanate sold by Upjohn.

| THANOL ® SF-2750[1] | 100 |
|---|---|
| Water | 20 |
| Trichlorofluoromethane | 35 |
| Silicone L-520[2] | 1.5 |
| Catalyst Example I | 4.0 |
| MONDUR MR | 140.5 |
| Cream time (seconds) | 8 |
| Rise time (seconds) | 43 |
| Gel time (seconds) | 45 |

[1] Polyol sold by Texaco Chemical Co., hydroxyl number 220.
[2] A silicone surfactant sold by Union Carbide Corp.

We claim:

1. A composition of matter having the formula

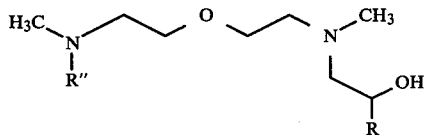

where R is hydrogen or lower alkyl and R" is methyl or

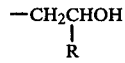

2. The composition of matter consisting of 2-[N-(dimethylaminoethoxyethyl)-N-methylamino]ethanol.

3. The composition of matter consisting of 2-[N-(dimethylaminoethoxyethyl)-N-methylamino]-1-methyl ethanol.

* * * * *

UNITED STATES PATENT OFFICE
CERTIFICATE OF CORRECTION

PATENT NO. : 4,433,170
DATED : February 21, 1984
INVENTOR(S) : Robert L. Zimmerman and Ernest L. Yeakey It is certified that error appears in the above-identified patent and that said Letters Patent are hereby corrected as shown below:

In the ABSTRACT, line 11, the word "piror" should read --prior--.

In column 1, line 64, "hydroxycontaining" should read --hydroxy-containing--.

In column 6, after line 24 and before line 26, insert
            --EXAMPLE VI

The compound of Example I may be used to prepare a packaging foam as shown below:--

Signed and Sealed this

Tenth Day of July 1984

[SEAL]

Attest:

Attesting Officer

GERALD J. MOSSINGHOFF

Commissioner of Patents and Trademarks